United States Patent [19]

Morris et al.

[11] Patent Number: 4,889,481

[45] Date of Patent: Dec. 26, 1989

[54] DUAL STRUCTURE INFRARED SURFACE COMBUSTION BURNER

[75] Inventors: Jeffrey R. Morris, Scio; Nicholas H. Burlingame, Belmont, both of N.Y.

[73] Assignee: Hi-Tech Ceramics, Inc., Alfred Station, N.Y.

[21] Appl. No.: 399,179

[22] Filed: Aug. 28, 1989

Related U.S. Application Data

[63] Continuation-in-part of Ser. No. 232,718, Aug. 16, 1988, abandoned.

[51] Int. Cl.$^4$ ............................................. F23D 14/12
[52] U.S. Cl. ................................. 431/328; 126/92 AC
[58] Field of Search ........................... 431/7, 328, 329; 126/92 AC; 23/277 C

[56] References Cited

U.S. PATENT DOCUMENTS

| | | | |
|---|---|---|---|
| 1,830,826 | 11/1931 | Cox | 431/328 |
| 3,216,478 | 11/1965 | Saunders et al. | 431/329 |
| 3,738,793 | 6/1973 | Reid et al. | 431/328 |
| 3,912,443 | 10/1975 | Ravault et al. | 431/329 X |
| 3,947,233 | 3/1976 | Sundberg | 431/328 |
| 4,154,568 | 5/1979 | Kendall et al. | 431/328 X |
| 4,643,667 | 2/1987 | Fleming | 431/328 X |

*Primary Examiner*—Randall L. Green
*Attorney, Agent, or Firm*—Webb, Burden, Ziesenheim & Webb

[57] ABSTRACT

A surface combustion radiant heat burner having an inlet plenum for receiving fuel and oxidant gas mixtures and a burner body in communication with the inlet plenum. The burner body has an inlet side facing the plenum and an outlet side defining a radiating surface. The burner body consists of a first layer of porous ceramic material adjacent the inlet side of the plenum and a second layer of porous ceramic material defining a radiating surface. At least the outer surfaces of the first porous layer and substantially all surfaces of the second porous layer are provided with a fully dense ceramic coating applied by chemical vapor deposition.

32 Claims, 1 Drawing Sheet

DUAL STRUCTURE INFRARED SURFACE COMBUSTION BURNER

RELATED APPLICATION

This application is a continuation-in-part of application Ser. No. 07/232,718, filed Aug. 16, 1988, abandoned.

BACKGROUND OF THE INVENTION

The invention relates to surface combustion infrared burners. In these burners the radiating surface of the burner is a body of porous material. A fuel/oxidant gas (e.g., fuel/air) mixture passes through the porous material and burns at the surface from which it emerges. The surface is heated by the flame and becomes the radiating surface of the burner. The porous material according to this invention is a multiple layer porous material. Such burners are disclosed, for example, in U.S. Pat. Nos. 1,830,826; 3,912,443; 3,216,478; 3,738,793; 3,947,233 and 4,643,667.

Surface combustion burners have many uses including, for example, use as space heaters, paint dryers, industrial process dryers for paper, plastics and ceramics, defrosting, food processing including deep fat fryers and broilers and deinfestation of grains.

Any warm body produces infrared energy. The higher the temperature of the body, the shorter the wavelength. Infrared energy is difficult to produce simply from a flame. Only about 10 to 20 percent of flame energy is infrared radiation. Solids in contact with flames can be excellent sources of infrared radiation and by controlling the temperature of the surface of the solid the wavelengths over which the radiation is distributed can be controlled.

It is known in the art that there are a number of surface combustion burners in which the porous material is porous refractory (ceramic), perforated ceramic, honeycomb ceramic, ceramic and metal fibers, drilled stainless steel, or even a metallic screen. A common expedient is to utilize a metal screen spaced from the combustion surface or a layer of increased pore size to hold the flame. The screen requires support from the burner plate surface and the supports reduce the effective emitter surface area by shielding it. This reduces the infrared output and can cause overheating of the burner plate. Additionally, the screen is a source of failure due to oxidation and slumping. Typically, the limited temperature resistance of the screen limits the temperature of the burner.

In any surface combustion burner the temperature of the inlet side of the burner plate must not become too hot because of the possibility of a backfire, that is, flame will occur on the wrong side of the porous material. The density and thickness of the plate of porous material as well as the rate of flow of gas through the plate and the temperature at the radiating side of the plate will affect the temperature on the inlet side of the plate. It is desirable that the flame be localized behind or near the radiating surface of a surface combustion burner since the essential purpose is to heat the surface by contact with the hot gases constituting the flame. The efficiency of the burner can be improved if the flame is maintained within the porous material and near the exit surface.

The flame in a surface combustion burner can be located within the porous material and near the exit surface by utilizing a burner plate having layers of different pore sizes. A fine pore base provides the initial combustion surface and insulation protecting against backfire while the flame is stabilized within a larger pore layer at the radiating surface. Increased efficiency and flame stability results from the use of the multiple layer burner body. Improved efficiency results in fuel savings. Improved flame stability allows for more versatile use. Also, the temperature range may be greater and the ratio of fuel to oxidant gas may extend over a larger range.

SUMMARY OF THE INVENTION

It is an advantage according to this invention to provide a burner body for a radiant heat burner comprised of at least two ceramic layers of different pore size.

It is a further advantage according to this invention to provide a long life burner body for a radiant heat burner comprised of at least two ceramic layers and having a fully dense ceramic coating over surfaces of both of said layers.

It is a further advantage according to this invention to provide a burner body for a radiant heat burner that is self-supporting eliminating the difficulties arising from screens and their supporting devices.

It is a further advantage according to this invention to provide a burner body for a surface combustion burner that is highly efficient because the flame is located within the structure and near the radiating surface.

It is yet another advantage according to this invention that the burner body consists entirely of ceramic materials which permit the use of higher surface temperatures and create correspondingly shorter wavelengths and higher energy density.

It is a still further advantage according to the invention to provide a lightweight burner body that has a low thermal mass permitting fast heat up and cool down.

Briefly, according to this invention, there is provided a surface combustion radiant heat burner comprising an inlet plenum for receiving fuel and oxidant gas mixtures from a supply inlet, or inlets and a burner body in communication with the inlet plenum. The burner body has an inlet side facing the plenum and an outlet side defining a radiating surface. The burner body may comprise a plate, a tubular wall, a curved wall or the like. The burner body comprises a first layer of fine porous material adjacent the inlet side and a second layer of coarse porous material adjacent the outlet side. At least the outer surfaces of the first porous layer and substantially all surfaces of the second porous layer are provided with a fully dense ceramic coating applied by chemical vapor deposition.

CVD (chemical vapor deposition) coatings are deposited on the atomic level allowing the formation of fully dense layers. This is accomplished by passing reactant gases over a heated substrate where they react and deposit.

In the case of SiC the gas must contain silicon and carbon vapor species. A typical type of feed gas is silanes which contain carbon and chlorine groups. These gases are passed over solid substrates heated above 900° C. Hydrogen gas is also added to control reaction and remove the chlorine from the system in the form of HCl gas.

The layer of fine porous material has a thickness sufficient to be self-supporting unless it is supported by a coarser material on its inlet side. The thickness of the fine porous layer is at least about 0.01 inch and preferably 0.75 inch. It is most desirable that the thickness of the fine porous layer be no less than ten times the thickness of the average pore diameter. The mean diameter of the pores of the fine pore structure may range from 0.00004 inch to 0.10 inch. The apparent porosity may range from 50 percent to 95 percent. The coarse layer of porous material has a thickness from about 0.05 inch to 0.40 inch. The mean diameter of the pores in the coarse porous structure may range from 0.05 to 0.40 inch and the apparent porosity may range from 50 percent to 95 percent.

The fine porous layer and the coarse porous layer may comprise a reticulated ceramic structure, a perforated ceramic structure, a honeycomb structure, a fiber weave or cloth structure or a fiber mat structure.

In preferred embodiments of the invention, the fine porous layer consists of any of a reticulated ceramic, a pressed ceramic plate with through holes or a fiber mat and the coarse porous layer may be any of a reticulated ceramic, a fiber weave or cloth or a ceramic honeycomb. Each of the structures from which the fine porous layer is formed may be combined with any one of the structures from which the coarse porous layer is made and each of the structures from which the coarse porous layer is made may be combined with any one of the structures from which the fine porous layer is made resulting in nine combinations from which a burner plate is constructed.

One or more intermediate layers of material may be disposed between the fine porous layer and coarse porous layer, each said intermediate layer having an interconnected pore structure.

In the preferred embodiments of the invention, all layers of materials in the burner plate are ceramic materials, for example, materials selected from the group consisting of lithium aluminosilicates silicates, $Si_3N_4$, $Al_2TiO_5$, sialon, $Si_2ON_2$, SiC, cordierite, mullite ceramic fibers and mixtures thereof.

The thickness of a self-supporting fine porous layer is preferably between 0.10 inch and 1.5 inches. The thickness of the coarse porous layer is preferably between about 0.08 and 0.25 inch.

In a specific embodiment of the invention, the fine porous layer comprises a reticulated ceramic having an interconnected pore structure defining about 30 to 100 pores per inch and the coarse porous layer comprises reticulated ceramic having an interconnected pore structure defining about 3 to 25 pores per inch with a fully dense SiC coating. In another specific embodiment, the fine porous layer comprises a reticulated ceramic having an interconnected pore structure defining about 30 to 100 pores per inch and the coarse porous layer comprises a 0.05 to 0.25 inch thick ceramic fiber woven cloth with 0.05 to 0.25 inch openings having a fully dense coating. In yet another specific embodiment of the invention, the fine porous layer comprises a reticulated ceramic having an interconnected pore structure defining about 30 to 100 pores per inch and the coarse porous layer comprises a ceramic defining a honeycomb structure having about 16 to 400 cells per square inch having a fully dense coating.

In embodiments of the invention, the fine porous layer is a low thermal expansion lithium aluminosilicate coated with a high emittance fully dense material.

BRIEF DESCRIPTION OF THE DRAWINGS

Further features and other objects and advantages of the invention will become clear from the following detailed description made with reference to the drawings in which.

DESCRIPTION OF THE PREFERRED EMBODIMENTS

Figure 1:
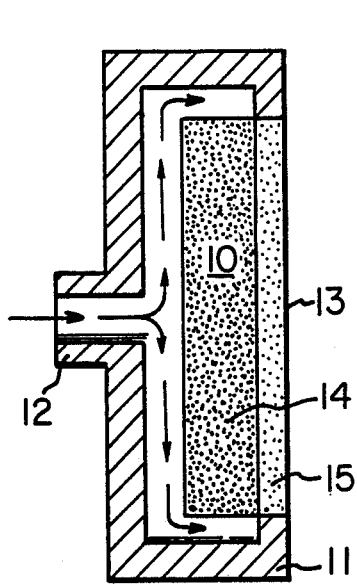
FIG. 1 is a section view through a radiant heat burner according to the invention.

Referring now to FIG. 1, a surface combustion burner comprises a burner plate 10 supported as one wall of a plenum 11. The fuel/air mixture is passed into the plenum through an intake port 12. The mixture is then forced through the burner plate where it burns near the outer surface 13 of the burner plate and infrared radiation is emitted from the hot outer surface 13.

The burner plate is comprised of at least two porous layers, one of a finer pore size than the other. The finer pore size layer 14 faces the plenum and the coarser pore size layer 15 carries the outer surface 13.

Figure 2:
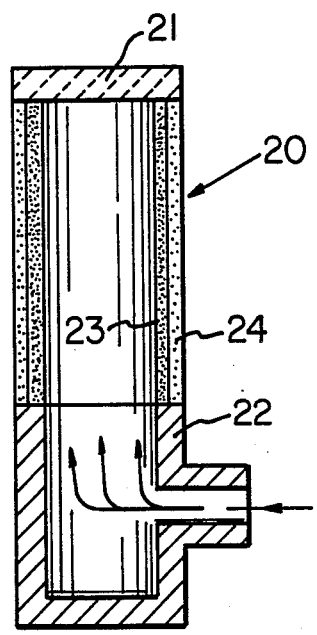
FIG. 2 is a section view through a tubular radiant heat burner according to the invention.

Referring to FIG. 2, the burner body 20 may be tubular and closed at one end with a cap 21 and in communication with an inlet plenum 22 at the other end. The finer porous layer 23 is at the inner diameter of the tubular body and the coarser porous layer 24 at the outer diameter.

EXAMPLE I

A burner plate would be constructed of a first 0.75 inch thick layer comprising a reticulated lithium aluminosilicates silicate ceramic with interconnected pores defining 65 pores per inch and a second 0.1 inch thick layer comprising reticulated lithium aluminosilicates silicate with interconnected pores defining 10 pores per inch. The outer surfaces of the fine porous layer and all surfaces of the coarse porous layer would be coated with fully dense silicon carbide.

Reticulated ceramics are made in several ways. One that is particularly satisfactory is disclosed in U.S. Pat. No. 4,568,595. The disclosure of that patent is incorporated herein by reference. In the process disclosed in that patent, a foamed polymer is submerged in a slurry of ceramic particles and then drained. The surfaces of the polymer are thereby coated with particulate ceramic. Thereafter, the entire structure is heated to burn out the polymer and to sinter the ceramic powder into a unitary structure. The layers of reticulated ceramic according to this invention can be formed together by attaching different pore size foams together prior to impregnating. They can also be joined in the green ceramic state (before burn out and sintering) and can be joined after firing in which case they may be held together with a cement that is applied in such a way as not to block the passage of gases from one layer to the other or they may simply be held together mechanically.

The silicon carbide coating may be applied by CVD to the coarse pore layer and the outer surface of the fine pore layer to provide a fully dense coating of its surfaces.

EXAMPLE II

A burner plate may be prepared from a first 0.75 inch layer of reticulated ceramic having interconnected pores defining 65 pores per inch and a second layer comprising a 0.06 inch thick ceramic fiber weave defining a 0.10 inch square mesh secured to the radiating face. The fiber weave was made from high alumina fibers. The alumina fibers and the outer surfaces of the fine porous layer would be coated by CVD to have a fully dense ceramic coating.

EXAMPLE III

A burner plate may be prepared from a first 0.75 inch layer of reticulated lithium aluminosilicates (LAS) ceramic having interconnected pores defining 65 pores per inch and a second layer comprising a honeycomb ceramic secured at the radiating face. Methods of forming honeycomb ceramic are well known including extrusion in the plastic state. The outer surface of the LAS layer and all of the surfaces of the honeycomb ceramic would be coated by CVD with a fully dense ceramic coating.

EXAMPLE IV

A burner plate may be prepared from a first 0.50 inch layer of a pressed porous ceramic plate having a second layer of a 0.3 inch thick 10 ppi reticulated ceramic layer secured to the radiating face. The pressed ceramic plate may be made of cordierite and contained a plurality of through holes, each through hole had a diameter of about 0.045 inch. The reticulated ceramic layer may be made from a reaction bonded SiC. The outer surfaces of the cordierite and the reticulated SiC would be coated by CVD with a ceramic coating.

EXAMPLE V

A burner plate may be prepared from a first 0.50 inch layer of a pressed porous ceramic plate having a second layer of a 0.06 inch thick ceramic fiber weave or cloth having a 0.10 inch square mesh secured to the radiation face. The pressed ceramic plate may be made of cordierite and contained a plurality of through holes, each through hole has a diameter of about 0.045 inch. The fiber weave and outer surface of the fine pore structure would be coated by CVD with a ceramic coating.

EXAMPLE VI

A burner plate may be prepared from a first 0.50 inch layer of a pressed porous ceramic plate having a second layer of a 0.3 inch thick ceramic honeycomb secured to the radiating face. The pressed ceramic plate may be made of cordierite and contained a plurality of through holes, each through hole had a diameter of about 0.045 inch. The ceramic honeycomb may have a porous structure with 64 cells per square inch. The outer surfaces of the pressed ceramic plate and the ceramic honeycomb would be coated by CVD to provide a fully dense coating.

EXAMPLE VII

A burner plate may be prepared from a first 0.018 inch thick layer of a ceramic fiber mat having a second layer of a 0.3 inch thick 10 ppi reticulated ceramic layer secured to the radiating face. These may be supported by attaching the combination to a 0.5 inch 65 ppi reticulated ceramic plate. The fiber mat might consist of 7 to 13 $\mu$m high $Al_2O_3$ fibers which were tightly woven. The outer surfaces of the fiber mat and the outer reticulated layer would be coated by CVD with SiC.

EXAMPLE VIII

A burner plate might be prepared from a first layer as described in Example VII and a second layer as described in Example V.

EXAMPLE IX

A burner plate may be prepared from a first layer as described in Example VII and a second layer as described in Example VI.

Examples I to IX have actually been made except for the fully dense coating. In each instance, it was found that the burner had excellent efficiency and flame stability. However, it was found that without the fully dense coatings, the burner blocks had poor service life. The difference is quantified by the following comparative examples.

EXAMPLE X (Comparative)

A burner block with a LAS structure was prepared with a thin particulate SiC coating upon the surface. The block was similar to that described in Example I except that the SiC coating was not applied by CVD and was not fully dense. The burner block was tested as a radiant heat burner at an input level of 300 kW/m$^2$hr at a temperature of about 1040° C. After only 100 hours the large pore outer layer was discolored, cracking and beginning to spall. After 300 hours, this layer was completely disrupted and flame stabilization effect lost. If it had been used as an overhead radiant burner in a process where the workpiece passes beneath the radiant burner, the workpiece would be contaminated by spalling from the burner face. Analysis of the remaining radiant heating surface after 300 hours showed a loss of about 13 percent of the $Li_2O$ from the underlying LAS structure. The flame atmosphere leaches chemical species from the large pore layer.

EXAMPLE XI

A burner block almost identical to that described in Example X (Comparative) was prepared but with a SiC coating applied to the porous layer by CVD. It was subjected to the same test as the burner block in Example X (Comparative) and after 3000 hours, the radiant heat surface was strong and fully intact. The CVD SiC coating provides a very strong surface which protects the underlying ceramic structure. The coating thickness varied from 5 to 50 $\mu$m.

Fibers suitable for forming the fine pore fiber mat may have diameters in the range of 0.5 microns to 50 microns, for example, and may have porosities in excess of 70 percent, for example.

Pressed plates may have randomly distributed pores, or a plurality of through holes, or both. Random pores may have diameters in the range of 0.05–50 microns and through holes in the range of 0.004 to 0.10 inch; a burner body comprising a coarse pore ceramic honeycomb over a fine pore pressed ceramic plate may be used; and a burner body comprising a coarse pore ceramic honeycomb over a fine pore fiber mat may be used.

Having thus defined the invention with the detail and particularity required by the Patent Laws, what is desired to be protected by Letters Patent is set forth in the following claims;

We claim:

1. In a surface combustion radiant heat burner comprising an inlet plenum for receiving fuel and oxidant gas mixtures from at least one supply inlet and a burner body secured in communication with the inlet plenum, said burner body having an inlet side facing the plenum and an outlet side defining a radiating surface, the improvement comprising,
said burner body comprising a first layer of porous ceramic material adjacent the inlet side and a second layer of porous ceramic material adjacent the outlet side defining said radiating surface,
said first layer of porous ceramic material having a thickness of at least about 0.01 inch and a fine interconnected porous structure with a mean pore diameter ranging from 0.00004 inch to 0.10 inch,
said second layer of porous ceramic material having a thickness of at least about 0.05 inch and a coarse interconnected porous structure with a mean diameter ranging from 0.05 to 0.40 inch, and
at least the outer surfaces of said first porous layer and substantially all surfaces of said second porous layer being provided with a fully dense ceramic coating.

2. The burner according to claim 1 wherein said first and second layers are reticulated materials.

3. The burner according to claim 1 wherein said first layer is a reticulated material and said second layer is a heat resistant fabric.

4. The burner according to claim 1 wherein said first layer is a reticulated material and said second layer is a heat resistant honeycomb structure.

5. The burner according to claim 1 wherein one or more intermediate layers of material are disposed between said first layer and said second layer, each said intermediate layer having an interconnected pore structure.

6. The burner according to claim 5 wherein said ceramic materials are selected from the group consisting of lithium aluminosilicates, $Si_3N_4$, $Al_2TiO_5$, sialon, $Si_2ON_2$, SiC, cordierite, mullite, ceramic fibers and mixtures thereof.

7. The burner according to claim 1 wherein said coating is selected from the group consisting of SiC and $Si_3N_4$.

8. The burner according to claim 1, 2, 3, 4, or 5 wherein the mean pore diameter of said first layer is between about 0.001 and 0.04 inch.

9. The burner according to claim 1 wherein said first layer comprises a reticulated ceramic having an interconnected pore structure defining about 30 to 100 pores per inch and said second layer comprises reticulated ceramic having an interconnected pore structure having about 3 to 25 pores per inch.

10. The burner according to claim 1 wherein said first layer comprises a reticulated ceramic having an interconnected pore structure defining about 30 to 100 pores per inch and said second layer comprises a ceramic defining a honeycomb structure having about 16 to 400 cells per square inch.

11. The burner according to claim 1 wherein said first layer comprises a reticulated ceramic having an interconnected pore structure defining about 30 to 100 pores per inch and said second layer comprises a 0.01 to 0.35 inch thick ceramic fiber woven cloth with 0.05 to 0.25 inch openings.

12. The burner according to claim 9, 10 or 11 wherein said first layer is a low thermal expansion lithium aluminosilicate.

13. A burner body for a surface combustion radiant heat burner,
said burner body comprising a first layer of porous ceramic material and a second layer of porous ceramic material defining a surface for radiating,
said first layer of porous ceramic material having a thickness of at least about 0.01 inch and a fine interconnected porous structure with a mean pore diameter ranging from 0.00004 to 0.10 inch,
said second layer of porous ceramic material having a thickness of at least about 0.05 inch and a coarse interconnected porous structure with a mean pore diameter ranging from 0.05 to 0.40 inch, and
at least the outer surfaces of said first porous layer and substantially all the surfaces of said second porous layer being provided with a fully dense ceramic coating.

14. The burner body according to claim 13 wherein said first layer and said second layer are reticulated materials.

15. The burner body according to claim 13 wherein said first layer is a reticulated material and said second layer is a heat resistant fabric.

16. The burner body according to claim 13 wherein said first layer is a reticulated material and said second layer is a heat resistant honeycomb structure.

17. The burner body according to claim 13 wherein one or more intermediate layers of material are disposed between said first layer and said second layer, each said intermediate layer having an interconnected pore structure.

18. The burner body according to claim 13 wherein said ceramic materials are selected from the group consisting of lithium aluminosilicates, $Si_3N_4$, $Al_2TiO_5$, sialon, $Si_2ON_2$, SiC, cordierite, mullite ceramic fibers and mixtures thereof.

19. The burner body according to claim 13 wherein said coating is selected from the group consisting of SiC and $Si_3N_4$.

20. The burner body according to claim 13 wherein the mean pore diameter of said first layer is between about 0.001 and 0.04 inch.

21. The burner body according to claim 13 wherein said first layer comprises a reticulated ceramic having an interconnected pore structure defining about 45 to 80 pores per inch and said second layer comprises a reticulated ceramic having an interconnected pore structure having about 3 to 25 pores per inch.

22. The burner body according to claim 13 wherein said first layer comprises a reticulated ceramic having an interconnected pore structure defining about 45 to 80 pores per inch and said second layer comprises a ceramic defining a honeycomb structure having about 16 to 400 cells per square inch.

23. The burner body according to claim 13 wherein said first layer comprises reticulated ceramic having an interconnected pore structure defining about 3 to 100 pores per inch and said second layer comprises a 0.01 to 0.35 inch thick ceramic fiber woven cloth with 0.05 to 0.25 inch openings.

24. The burner body according to claim 21, 22 or 23 wherein said first layer is a low thermal expansion lithium aluminosilicate.

25. The burner according to claim 1 wherein said first layer is a pressed ceramic plate and said second layer is a reticulated ceramic.

26. The burner according to claim 1 wherein said first layer comprises a pressed ceramic plate with a plurality of through holes, holes back of said through holes having a diameter of 0.004 to 0.10 inch and said second layer is a reticulated ceramic having an interconnected pore structure having about 3 to 25 pores per inch.

27. The burner according to claim 1 wherein said first layer is a pressed ceramic plate and said second layer is a ceramic fiber woven cloth.

28. The burner according to claim 1 wherein said first layer comprises a pressed ceramic plate with a plurality of through holes, holes back of said through holes having a diameter of 0.004 to 0.10 inch and said second layer comprises a 0.01 to 0.35 inch thick ceramic fiber woven cloth.

29. The burner according to claim 1 wherein said first layer is a fiber mat and said second layer is a ceramic fiber woven cloth.

30. The burner according to claim 1 wherein said first layer is a fiber mat having fiber sizes in the range of 0.5 $\mu$m to 50 microns and porosities in excess of 70 percent and said second layer is a ceramic fiber woven cloth having a thickness between 0.01 and 0.35 inch.

31. The burner according to claim 1 wherein said first layer is a fiber mat and said second layer is a reticulated material.

32. The burner according to claim 1 wherein said first layer is a fiber mat and said second layer is a reticulated ceramic having an interconnected pore structure having about 3 to 25 pores per inch.

* * * * *